(12) United States Patent
Di Silvestro et al.

(10) Patent No.: US 6,867,256 B1
(45) Date of Patent: Mar. 15, 2005

(54) THERMOPLASTIC COPOLYAMIDE, COMPOSITION BASED THEREON

(75) Inventors: Giuseppe Di Silvestro, Lentate Sul Seveso (IT); Cesare Guaita, Tradate (IT); Franco Speroni, Ceriano Laghetto (IT); Cuiming Yuan, Milan (IT); Haichun Zhang, Legnano (IT)

(73) Assignee: Nyltech Italia, Ceriano Laghetto (IT)

( * ) Notice: Subject to any disclaimer, the term of this patent is extended or adjusted under 35 U.S.C. 154(b) by 0 days.

(21) Appl. No.: 09/462,381

(22) PCT Filed: Jun. 24, 1998

(86) PCT No.: PCT/EP98/03858

§ 371 (c)(1),
(2), (4) Date: Mar. 27, 2000

(87) PCT Pub. No.: WO99/03909

PCT Pub. Date: Jan. 28, 1999

(30) Foreign Application Priority Data

Jul. 17, 1997 (FR) .............................. 97 09313

(51) Int. Cl.$^7$ ............................... C08G 69/00

(52) U.S. Cl. ................ 524/606; 528/350; 528/44; 528/48; 528/74; 528/310

(58) Field of Search .................. 525/432, 434, 525/435, 436, 418, 419, 420; 528/310, 318, 323, 324, 327, 328, 329.1, 332, 335, 337, 338; 524/606

(56) References Cited

U.S. PATENT DOCUMENTS

| | | | | |
|---|---|---|---|---|
| 4,255,560 A | * | 3/1981 | Meyer et al. | 528/339 |
| 5,480,944 A | * | 1/1996 | Aharoni | 525/432 |
| 5,760,163 A | * | 6/1998 | Fisch et al. | 528/310 |
| 6,541,600 B1 | * | 4/2003 | Wang et al. | 528/310 |
| 2003/0176593 A1 | * | 9/2003 | Bordes et al. | 525/419 |

FOREIGN PATENT DOCUMENTS

| | | |
|---|---|---|
| WO | 92 08749 | 5/1992 |
| WO | 93 09162 | 5/1993 |
| WO | 95 06081 | 3/1995 |

* cited by examiner

Primary Examiner—Katarzyna Wyrozebski
(74) Attorney, Agent, or Firm—Burns, Doane, Swecker & Mathis, L.L.P.

(57) ABSTRACT

The invention concerns a thermoplastic copolyamide and composition comprising as matrix said thermoplastic copolyamide, and a method of making such thermoplastic copolyamide. More particularly it concerns a copolyamide of the statistical tree type resulting from the reaction between a plurifunctional monomer comprising at least three reactive functions to form an amide function, said functions being two different types, and bifunctional monomer conventionally used in making linear polyamides. The resulting copolyamide has a very low softness index in molten state compared to the linear polyamide and improved shock-resistant properties. The invention also concerns with methods for making these copolyamides and composition for molding, extruding or injecting parts. Said compositions comprise fillers and additives and said copolyamide as a matrix.

30 Claims, 2 Drawing Sheets

THERMOPLASTIC COPOLYAMIDE, COMPOSITION BASED THEREON

Figure 1A:
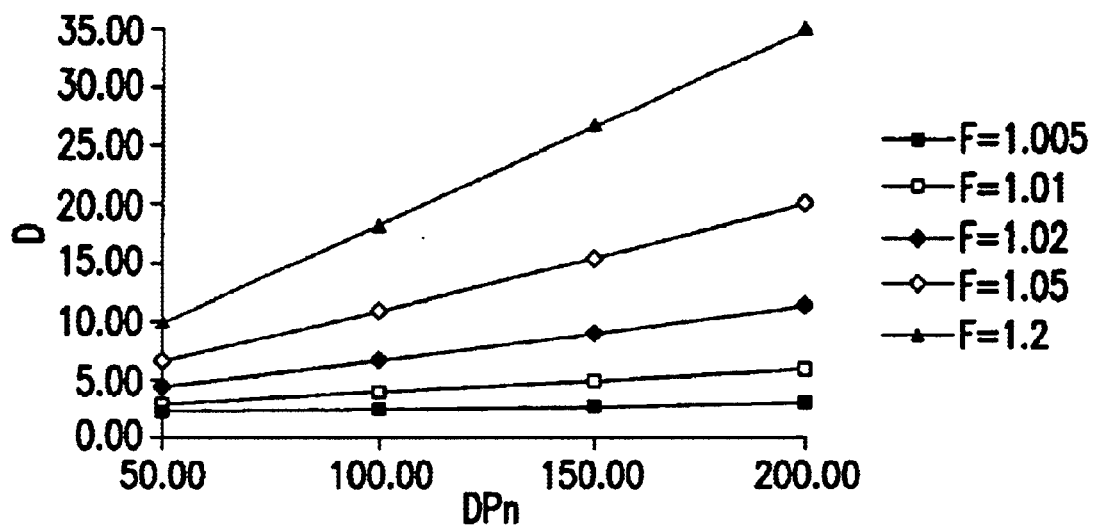

The present invention relates to a thermoplastic copolyamide and to a composition comprising this thermoplastic copolyamide as matrix, as well as to a process for manufacturing such a thermoplastic copolyamide.

In the field of parts made of plastic, many parts are obtained by moulding a composition comprising a polyamide as matrix. The polyamides generally used are aliphatic, aromatic or semiaromatic linear polyamides.

The new processes for forming these compositions such as, for example, extrusion-blow moulding require compositions having a high melt viscosity so that the extruded part before blow moulding undergoes little or no deformation under the effect of its own weight. However, the mechanical, elastic and impact-strength properties of the parts must not be affected or only slightly so. Certain solutions have been proposed such as the use of high-viscosity linear polyamides obtained by post-condensation in the solid state, or by the addition of chain extenders. However, these solutions are often difficult to carry out or impair certain properties of the parts obtained.

The subject of the invention is a novel polyamide having a high melt viscosity, which may be obtained by a simple manufacturing process and with satisfactory mechanical properties, without the use of processes for increasing this viscosity which are either expensive and difficult to control or are detrimental to the properties of the manufactured part.

For this purpose, the invention proposes a novel copolyamide having a structure of the random-tree type.

This copolyamide is the result of the reaction between at least one polyfunctional monomer satisfying the following general formula I:

in which:
- n is an integer greater than or equal to 2, preferably between 2 and 10 (limits inclusive),
- $R_1$, $R_2$ may be identical or different and represent a covalent bond or an aliphatic, arylaliphatic, aromatic or alkylaromatic hydrocarbon radical,
- R is a linear or branched aliphatic radical, a substituted or unsubstituted cycloaliphatic radical, a substituted or unsubstituted aromatic radical possibly comprising several aromatic rings and/or hetero atoms, or a polymeric chain possibly containing hetero atoms,
- A represents the amine or amine salt functional group, or the acid, ester, acid halide or amide functional group,
- B represents the amine or amine salt functional group when A represents an acid, ester, acid halide or amide functional group, and an acid, ester, acid halide or amide functional group when A represents an amine or amine salt functional group, and at least one of the bifunctional monomers of the following formulae II to IV with, optionally, at least one of the monofunctional monomers of the following formulae V or VI, or with a prepolymer obtained from at least one bifunctional monomer of the following formulae II to IV and, optionally, at least one monofunctional monomer of the following formulae V or VI, the bifunctional monomers satisfying the following general formulae:

and/or

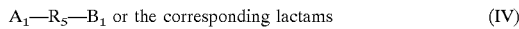

the monofunctional monomers satisfying the following general formulae:

and/or

in which
- $A_1$, $B_1$ represent, respectively, an acid, ester or acid chloride functional group and an amine functional group or an amine salt,
- $R_3$, $R_4$, $R_5$, $R_6$, $R_7$ represent substituted or unsubstituted, aromatic, linear or branched, alkyl hydrocarbon radicals or alkylaryl, arylalkyl, or cycloaliphatic radicals possibly including unsaturated groups.

According to a preferred characteristic of the invention, the radical R is an aromatic radical, $R_1$, $R_2$ each representing a covalent bond.

Moreover, the functional groups B and A in formula I are an acid functional group and an amine functional group, respectively, the acid functional group number n being advantageously 2.

Thus, suitable and preferred polyfunctional monomers of the invention are, especially, monomers thermally stable at a temperature greater than 150° C. By way of example, mention may be made of polyfunctional monomers in accordance with formula I in which R represents an aromatic radical such as aminophthalic acid, or a linear aliphatic radical such as the diacid 3-aminopimellic acid or the acid 6-aminoundecanedioic acid. It is also possible to mention α-amino acids such as aspartic acid and glutamic acid. Natural amino acids may also be used as polyfunctional monomer if their thermal stability is high enough.

Difunctional monomers of formulae II to IV are the monomers used for the manufacture of linear thermoplastic polyamides. Thus, mention may be made of ω-aminoalkanoic compounds comprising a hydrocarbon chain having from 4 to 12 carbon atoms, or lactams derived from these amino acids, such as ε-caprolactam, saturated aliphatic dicarboxylic acids having from 6 to 12 carbon atoms such as, for example, adipic acid, azeleic acid, sebacic acid and dodecanoic acid, biprimary diamines, preferably linear or branched, saturated aliphatic biprimary diamines having from 6 to 12 carbon atoms, such as, for example, hexamethylenediamine, trimethylhexamethylenediamine, tetramethylenediamine and m-xylenediamine.

Of course, mixtures of these monomers may be used.

The preferred difunctional monomers of the invention are ε-caprolactam or hexamethylenediamine and adipic acid, or a mixture of these.

According to another characteristic of the invention, the molar ratio of the monofunctional monomers of formula I to the sum of the difunctional monomers of formulae II to IV and monofunctional monomers of formulae V and VI is between 0.01% and 5%, preferably between 0.05% and 1%, in order to obtain a copolyamide having a level of mechanical properties which is equivalent to that of the corresponding linear polyamide.

The copolyamide of the invention has a melt flow index (MFI) of less than 5 g/10 minutes (measured at 275° C. under a load of 2160 g) and, advantageously, a molecular-mass distribution index D of greater than 2.

The molecular-mass distribution index D is a function of the degree of polymerization DPn and of the functionality factor F of the polymer.

The functionality factor F is calculated from the equation:

$$F = 1 + \frac{N_2}{N_1 + N_2}$$

in which $N_2$ represents the number of moles of the polyfunctional compound, $N_1$ represents the number of moles of caprolactam or of difunctional monomer.

DPn is calculated from the following equation:

$$DPn = \frac{A_2/B_2 - 1}{F - 1}$$

in which $B_2$ represent the number concentration of $NH_2$ functional groups in the end polymer and $A_2$ represents the number concentration of COOH functional groups in the same end polymer.

The distribution coefficient D is given by the following formula:

$$D = \frac{A_2/B_2 + 1}{F}$$

It is also possible to determine the number of branches of the hyperbranched polymer using the following formula:

$$R = B_2/A_2 - 1 \text{ or } R = DPn(F-1).$$

Thus, curves may be plotted which make it possible to determine the number of branches R and the distribution coefficient D as a function of the degree of polymerization DPn for various values of the functionality factor F.

Figure 1B:
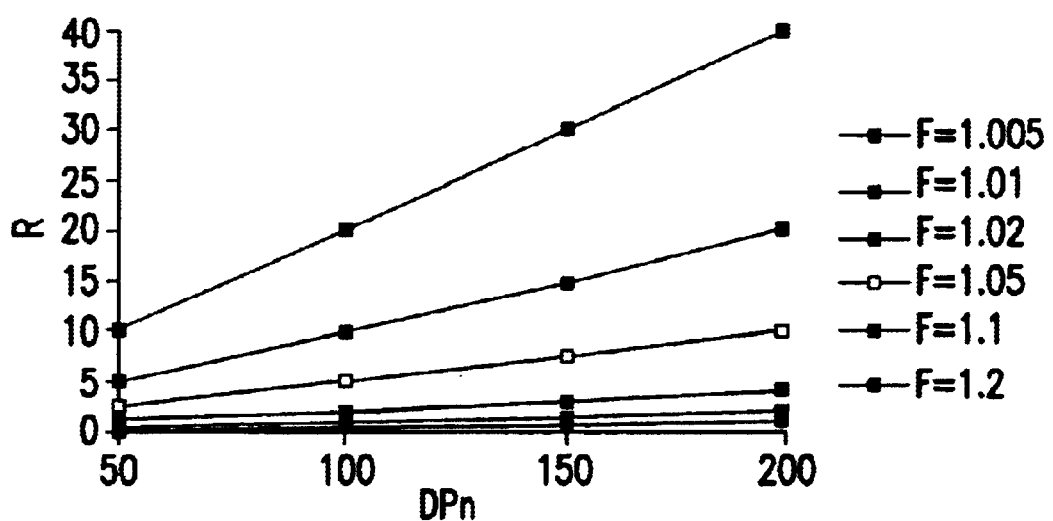

Examples of these curves are shown in the appended FIGS. 1a and 1b.

The copolymers of the invention also exhibit an improved impact strength as compared with linear polyamides obtained via the corresponding difunctional monomers. Thus, in the case of a copolymer obtained by using ε-caprolactam as the difunctional monomer, the impact strength of the copolyamide is greater than 60 J/m, while that of the corresponding linear polyamide, that is to say polycaprolactam, is less than 50 J/m.

Such copolyamides may be used in many applications such as the manufacture of moulded or injection-moulded parts.

They are especially suitable for the manufacture of parts by extrusion-blow moulding techniques. This is because the low melt flow index of the copolyamide makes it possible to limit the deformation of the parisons during their extrusion, before the blow moulding step.

It is also possible to manufacture articles from the copolyamides of the invention by injection-moulding processes. These articles exhibit markedly superior mechanical properties to those of articles obtained by injection moulding a composition based on a linear polyamide having the same melt flow index.

The copolyamide of the invention may also be used as the polymeric matrix for producing compositions comprising various additives or fillers for reinforcement or for filling.

The subject of the invention is also a composition, especially intended to be moulded in order to form parts or articles. This composition comprises, as polymeric matrix, at least one polyamide according to the invention and optionally other additives such as moulding or demoulding aids, heat stabilizers, light stabilizers, antioxidants, fire retardants, pigments, colorants and lubricants.

The composition may also include agents which improve the impact strength and/or filling or reinforcing fillers.

The compositions of the invention may also include, as polymeric matrix, in addition to the polyamide as described above, other thermoplastics such as aliphatic linear polyamides or aromatic or semiaromatic polyamides, for example.

According to a characteristic of the invention, the compositions of the invention are obtained by mixing, generally in a single-screw or twin-screw extruder, a polyamide according to the invention with the various additives, this mixing generally being carried out in the melt state of the polyamide, then by extruding the compound in the form of rods which are then cut into granules. Next, the moulded parts are produced by melting the granules produced above and feeding the composition in the melt state into the appropriate moulding, injection-moulding or extrusion devices.

The subject of the invention is also a process for manufacturing a copolyamide according to the invention.

In a first method of implementing this manufacturing process, a monomer mixture is produced with predetermined proportions of each component. The said mixture is polymerized under conditions and according to an operating method which are equivalent to those used for the manufacture of the linear polyamide corresponding to the difunctional monomers employed. Thus, when ε-caprolactam is employed, water is added to the monomer mixture in order to initiate the hydrolytic opening of the caprolactam.

According to a second method of implementing the invention, a linear polyamide prepolymer is manufactured by the polycondensation of difunctional monomers in order to obtain a prepolymer having a number-average molecular weight $\overline{M}_n$ of about 2000 to 3000, approximately.

The polyfunctional monomer is added to the linear prepolymer and the polymerization is continued either in the melt or in the solid state. This method of production makes it possible, in particular, to obtain hyperbranched copolyamides using polyfunctional monomers that are thermally stable at relatively low temperatures, for example of less than 200° C., since the solid-state postcondensation is carried out at lower temperatures than those of the melt polymerization.

The polyfunctional monomer may be added into an extruder or into a reactor, the solid-state post-condensation taking place under the conventional and usual conditions employed for that of linear polyamides.

According to another variant of this method of implementing the process for manufacturing a copolyamide according to the invention, the polyfunctional monomer is added with a catalyst, thus making it possible to carry out the reaction directly in the extruder. Suitable catalysts are the catalysts conventionally used for amidification reactions or reactions in which amide functional groups undergo polycondensation, such as, for example, phosphorus compounds.

Figure 2:
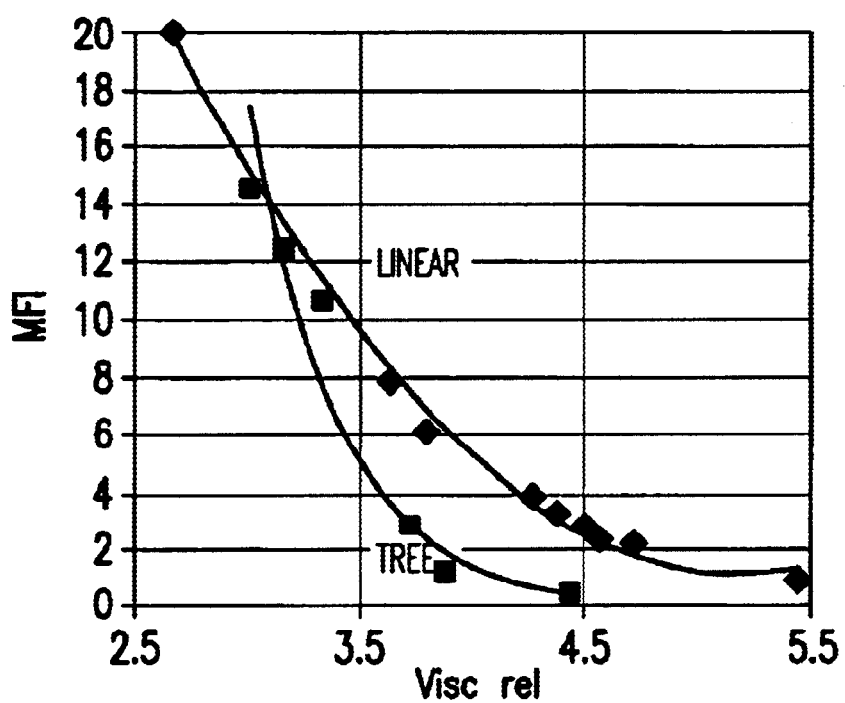

Further details and advantages of the invention will be more clearly apparent in the light of the examples given below solely by way of illustration and in the light of the appended figures in which:

FIGS. 1a and 1b show graphs comprising a number of curves for different values of the functionality factor F representing, respectively, the variation in the distribution coefficient D and in the number of branches R as a function of the degree of polymerization DPn, and FIG. 2 shows the variation in the melt flow index as a function of the relative viscosity of a linear polyamide and of a copolyamide according to the invention and corresponding to Examples B and 4.

EXAMPLES 1 TO 3

The synthesis of a copolyamide according to the invention was carried out by adding predetermined amounts of a polyfunctional monomer according to Formula I, namely 5-aminoisophthalic acid, into the reaction mass of ε-caprolactam of a conventional process for preparing nylon-6.

The polymerization reaction was carried out for 12 hours at 270° C. in an inert atmosphere (nitrogen).

To initiate the polymerization, by hydrolytic scission of caprolactam, a small amount of water is added to the reaction mixture.

For each polymer obtained, the relative viscosity η, the number concentration of amine and acid terminal groups, and the molecular-mass distribution factor D and the melt flow index (MFI) are measured.

This index is determined according to the ASTM D1238 standard under a load of 2160 g and at a temperature of 275° C.

The relative viscosity η is determined using a solution containing 1% by weight of polymer in 96% sulphuric acid.

The distribution index D is a function of the degree of polymerization DPn and of the functionality factor F of the polymer.

The numbers of amine and acid terminal groups in the final copolyamide are determined by potentiometric analysis and are expressed in meq/kg of polymer.

TABLE I

| Ex. | AIP molar % | H₂O wt. % | MFI g/10 min. | D | A meq/kg NH₂ | B meq/kg COOH | η |
|---|---|---|---|---|---|---|---|
| A | — | 0.042 | 6.6 | 2 | 30.9 | 31.9 | 3.89 |
| 1 | 0.25 | 0.10 | 0.38 | 3 | 27 | 53.9 | 4.55 |
| 2 | 0.50 | 0.1 | 0.53 | 3.8 | 21 | 59.3 | 4.45 |
| 3 | 1.00 | 0.07 | 0.83 | 6.66 | 16.5 | 94 | 4.36 |

AIP: 5-aminoisophthalic acid

EXAMPLES 4 TO 8

Tests carried out according to the operating method of Examples 1 to 3 with 0.5 mol. % of 5-aminoisophthalic acid were carried out with different polymerization times. The results are indicated in Table II below.

TABLE II

| Ex. | Polymerization time (h) | MFI g/10 min. | A₂ (NH₂) (meq/kq) | B₂ (COOH) (meq/kq) | η |
|---|---|---|---|---|---|
| B | 12 | 14.1 | 43.3 | 36.1 | 3.56 |
| 4 | 4 | 14.6 | 35.1 | 78.2 | 3.02 |
| 5 | 6 | 12.5 | 32.7 | 71.7 | 3.18 |
| 6 | 8 | 10.7 | 30.3 | 74 | 3.33 |
| 7 | 10 | 2.9 | 29.7 | 62.4 | 3.72 |
| 8 | 12 | 1.3 | 26.2 | 60.9 | 3.87 |

These results demonstrate that, in order to obtain a polyamide having a melt flow index equivalent to that of a linear polyamide, the polymerization time can be divided by 3. Moreover, the polyamide of the invention can have a melt flow index ten to twenty times lower than that of a linear polyamide. The variation in this melt flow index as a function of the viscosity is illustrated in the appended FIG. 2.

The mechanical properties of the copolyamide obtained in Example 4 were determined on test pieces having a width of 12.57 mm, a thickness of 3.16 mm and a length of 50 or 80 mm. Table III below gives the results compared with a PA-6 linear polyamide.

TABLE III

| Properties | Branched polyamide of Example 4 | PA-6 linear polyamide |
|---|---|---|
| Relative viscosity | 3.33 | 3.4 |
| Number of NH₂ terminal functional groups (meq/kg) | 30 | 38 |
| Number of COOH terminal functional groups (meq/kg) | 74 | 37 |
| IZOD impact strength (ASTM D256 standard) (J/m) | 70.6 | 40–50 |
| Flexural modulus (ASTM D638 standard) (N/mm²) | 2650 | 2750 |
| Tensile strength (N/mm²) | 75.2 | 70 |
| Elongation % | 180 | 200 |

What is claimed is:

1. Thermoplastic copolyamide resulting from the reaction between at least one polyfunctional monomer satisfying the following general formula I:

$$(AR_1)\text{—}R\text{—}(R_2B)_n \qquad (I)$$

in which:

n is an integer greater than or equal to 2, $R_1$, $R_2$ may be identical or different and represent a covalent bond or an aliphatic, arylaliphatic, aromatic or alkylaromatic hydrocarbon radical, R is a linear or branched aliphatic radical, a cycloaliphatic radical, an aromatic radical, or a polymeric chain, A represents an amine or amine salt functional group, or an acid, ester, acid halide or amide functional group, B represents an amine or amine salt functional group when A is an acid, ester, acid halide or amide functional group, or B is an acid, ester, acid halide or amide function group when A is an amine or amine salt functional group, and at least one bifunctional monomer of the following formulae II to IV, and optionally, a monofunctional monomer of the following formulae V or VI; or a prepolymer obtained from at least one bifunctional monomer of the following formulae II to IV and, optionally, at least one monofunctional monomer of the following formulae V or VI, the bifunctional monomers satisfying the following general formulae:

$$A_1\text{—}R_3\text{—}A_1 \qquad (II),$$

$$B_1\text{—}R_4\text{—}B_1 \qquad (III),$$

$$A_1\text{—}R_5\text{—}B_1 \qquad (IV)$$

and/or the corresponding lactams of (IV)

the monofunctional monomers satisfying the following general formulae:

$$R_6\text{—}B_1 \qquad (V)$$

and/or $$R_7-A_1 \qquad (VI)$$

in which

A₁, B₁ may be identical or different and represent an acid, ester or acid chloride functional group, an amine functional group or an amine salt, R₃, R₄, R₅ may be identical or different and represent linear or branched alkyl hydrocarbon radicals or cycloaliphatic radicals optionally including unsaturated groups, R₆, R₇ may be identical or different and represent aromatic, linear or branched, alkyl hydrocarbon radicals or alkylaryl arylalkyl or cycloaliphatic radicals optionally including unsaturated groups.

2. Copolyamide according to claim 1, wherein the radical R is an aromatic radical.

3. Copolyamide according to claim 1, wherein the molar ratio of the multifunctional monomers of formula I to the sum of the bifunctional monomers of formulae II, III, IV and monofunctional monomers of formulae V and VI is between 0.01 and 5.

4. Copolyamide according to claim 1, wherein the monomer of formula I is a compound in which A represents the amine functional group, B represents the acid functional group, n is equal to 2, R represents an aromatic radical and R₁ and R₂ represent a covalent bond.

5. Copolyamide according to claim 1 wherein the monomer of formula I is 5-aminoisophthalic acid.

6. Copolyamide according to claim 1 wherein the monomer of formula I is 6-aminoundecanedioic acid.

7. Copolyamide according to claim 1 having a melt flow index (MFI) of less than 5 g/10 minutes (measured at 275° C. under a load of 2160 g).

8. Copolyamide according to claim 1, having a molecular-mass distribution index D of greater than 2.

9. Process for manufacturing a copolyamide according to claim 1, comprising adding, into the reaction mass containing bifunctional monomers of formulae II to IV and, optionally, monofunctional monomers of formulae V or VI, a predetermined amount of a multifunctional monomer of formula I and then in carrying out the polycondensation under the temperature and pressure conditions used for the polymerization of the linear polyamide which would be formed from the monofunctional monomers of formulae II to IV and, optionally, monofunctional monomers of formulae V or VI.

10. Process for manufacturing a copolyamide according to claim 1, comprising synthesizing a prepolymer of a linear polyamide from one or more monomers of formulae II to IV and, optionally, monofunctional monomers of formula V or VI, in adding, to this said prepolymer in the solid state or in the melt, a predetermined amount of polyfuncitonal monomer and then making said polyfuncitonal monomer react with said prepolymer either in the solid state or in the melt.

11. Process according to claim 10, wherein an amidification or polycondensation catalyst is added with the polyfuncitonal monomer.

12. Composition comprising, as matrix, at least one copolyamide according to claim 1 and other components chosen from the group comprising reinforcing fillers, filling fillers, antioxidants, stabilizers, pigments, colarants, fire retardants and moulding aids.

13. The thermoplastic copolyamide according to claim 1, wherein n is an integer between 2 and 10, limits inclusive.

14. The copolyamide according to claim 3, wherein the molar ratio is between 0.05 and 1.

15. Copolyamide according to claim 1, wherein R is a polymeric chain containing hetero atoms.

16. Copolyamide according to claim 1, wherein R is an aromatic radical comprising several aromatic rings and/or hetero atoms.

17. Thermoplastic copolyamide resulting from the reaction between at least one polyfunctional monomer satisfying the following general formula I:

$$(AR_1)-R-(R_2B)_n \qquad (I)$$

in which:

n is an integer greater than or equal to 2,

R₁, R₂ may be identical or different and represent a covalent bond or an aliphatic, arylaliphatic, aromatic or alkylaromatic hydrocarbon radical, R is a linear or branched aliphatic radical, cycloaliphatic radical, an aromatic radical, or a polymeric chain, A represents an amine or amine salt functional group, or an acid, ester, acid halide or amide functional group, B represents an amine or amine salt functional group when A is an acid, ester, acid halide or amide functional group, or B is an acid, ester, acid halide or amide functional group when A is an amine or amine salt functional group, and at least one bifunctional monomer of the following formulae II to IV and optionally, a monofunctional monomer of the following formulae V or VI; or a prepolymer obtained from at least one bifunctional monomer of the following formulae II to IV and optionally, at least one monofunctional monomer of the following formulae V or VI, the bifunctional monomers satisfying the following general formulae:

$$A_1-R_3-A \qquad (II),$$

$$B_1-R_4-B_1 \qquad (III),$$

$$A_1-R_5-B_1 \qquad (IV)$$

and/or the corresponding lactams of (IV)

the monofunctional monomers satisfying the following general formulae;

$$R_6-B_1 \qquad (V)$$

and/or $$R_7-A_1 \qquad (VI)$$

in which

A₁, B₁ may be identical or different and represent an acid, ester or acid chloride functional group, an amine functional group or an amine salt, R₃, R₄, R₅, R₆, R₇ represent aromatic, linear or branched, alkyl hydrocarbon radicals or alkylaryl, arylalkyl or cycloaliphatic radicals optionally including unsaturated groups;

wherein a molar ratio of the multifunctional monomers of formula I to a sum of the difunctional monomers of formulae II, III, IV and monofunctional monomers of formulae V and VI is between 0.01 and 5.

18. Copolyamide according to claim 17, wherein the molar ratio of the multifunctional monomers of formula I to the sum of the difunctional monomers of formulae II, III, IV and monofunctional monomers of formula V and VI is between 0.05 and 1.

19. Copolyamide according to claim 17, wherein the radical R is an aromatic radical.

20. Copolyamide according to claim 17, wherein the monomer of formula I is a compound in which A represents the amine functional group, B represents the acid functional group, n is equal to 2, R represents an aromatic radical and $R_1$ and $R_2$ represent a covalent bond.

21. Copolyamide according to claim 17, wherein the monomer of formula I is 5-aminoisophthalic acid.

22. Thermoplastic copolyamide resulting from the reaction between at least one polyfunctional monomer satisfying the following general formula I:

$$(AR_1)\text{—}R\text{—}(R_2B)_n \qquad (I)$$

in which:

n is an integer greater than or equal to 2, $R_1$, $R_2$ may be identical or different and represent a covalent bond or an aliphatic, arylaliphatic, aromatic or alkylaromatic hydrocarbon radical, R is a linear or branched aliphatic radical, cycloaliphatic radical, an aromatic radical, or a polymeric chain, A represents an amine or amine salt functional group, or an acid, ester, acid halide or amide functional group, B represents an amine or amine salt functional group when A is an acid, ester, acid halide or amide functional group, or B is an acid, ester, acid halide or amide functional group when A is an amine or amine salt functional group, and at least one bifunctional monomer of the following formulae II to IV and optionally, a monofunctional monomer of the following formulae V or VI; or a prepolymer obtained from at least one bifunctional monomer of the following formulae II to IV and optionally, at least one monofunctional monomer of the following formulae V or VI, the bifunctional monomers satisfying the following general formulae:

$$A_1\text{—}R_3\text{—}A \qquad (II),$$

$$B_1\text{—}R_4\text{—}B_1 \qquad (III),$$

$$A_1\text{—}R_5\text{—}B_1 \qquad (IV)$$

and/or the corresponding lactams of (IV)

the monofunctional monomers satisfying the following general formulae;

$$R_6\text{—}B_1 \qquad (V)$$

and/or

$$R_7\text{—}A_1 \qquad (VI)$$

in which $A_1$, $B_1$ may be identical or different and represent an acid, ester or acid chloride functional group, an amine functional group or an amine salt, $R_3$, $R_4$, $R_5$, $R_6$, $R_7$ represent aromatic, linear or branched, alkyl hydrocarbon radicals or alkylaryl, arylalkyl or cycloaliphatic radicals optionally including unsaturated groups;

wherein a molar ratio of the multifunctional monomers of formula I to a sum of the difunctional monomers of formulae II, III, IV and monofunctional monomers of formulae V and VI is between 0.01 and 5, wherein the monomer of formula I is 6-aminoundecanedioic acid.

23. Copolyamide according to claim 17, having a melt flow index (MFI) of less than 5 g/10 minutes (measured at 275° C. under a load of 2160 g).

24. Thermoplastic copolyamide resulting from the reaction between at least one polyfunctional monomer satisfying the following general formula I:

$$(AR_1)\text{—}R\text{—}(R_2B)_n \qquad (I)$$

in which:

n is an integer greater than or equal to 2, $R_1$, $R_2$ may be identical or different and represent a covalent bond or an aliphatic, arylaliphatic, aromatic or alkylaromatic hydrocarbon radical, R is a linear or branched aliphatic radical, cycloaliphatic radical, an aromatic radical, or a polymeric chain, A represents an amine or amine salt functional group, or an acid, ester, acid halide or amide functional group, B represents an amine or amine salt functional group when A is an acid, ester, acid halide or amide functional group, or B is an acid, ester, acid halide or amide functional group when A is an amine or amine salt functional group, and at least one bifunctional monomer of the following formulae II to IV and optionally, a monofunctional monomer of the following formulae V or VI; or a prepolymer obtained from at least one bifunctional monomer of the following formulae II to IV and optionally, at least one monofunctional monomer of the following formulae V or VI, the bifunctional monomers satisfying the following general formulae:

$$A_1\text{—}R_3\text{—}A \qquad (II),$$

$$B_1\text{—}R_4\text{—}B_1 \qquad (III),$$

$$A_1\text{—}R_5\text{—}B_1 \qquad (IV)$$

and/or the corresponding lactams of (IV)

the monofunctional monomers satisfying the following general formulae;

$$R_6\text{—}B_1 \qquad (V)$$

and/or

$$R_7\text{—}A_1 \qquad (VI)$$

in which $A_1$, $B_1$ may be identical or different and represent an acid, ester or acid chloride functional group, an amine functional group or an amine salt, $R_3$, $R_4$, $R_5$, $R_6$, $R_7$ represent aromatic, linear or branched, alkyl hydrocarbon radicals or alkylaryl, arylalkyl or cycloaliphatic radicals optionally including unsaturated groups;

wherein a molar ratio of the multifunctional monomers of formula I to a sum of the difunctional monomers of formulae II, III, IV and monofunctional monomers of formulae V and VI is between 0.01 and 5, having a molecular-mass distribution index D of greater than 2.

25. Process for manufacturing a copolyamide according to claim 17, further comprising adding, into a reaction mass containing bifunctional monomers of formulae II to IV and, optionally, monofunctional monomers of formula V or VI, leading to a linear polyamide, a predetermined amount of a multifunctional monomer of of formula I and then in carrying out polycondensation under temperature and pressure conditions used for polymerization of said linear polyamide.

26. Process for manufacturing a thermoplastic copolyamide, the process comprising reacting at least one polyfunctional monomer satisfying the following general formula I:

$$(AR_1)\text{—}R\text{—}(R_2B)_n \qquad (I)$$

in which:
n is an integer greater than or equal to 2,
$R_1$, $R_2$ may be identical or different and represent a covalent bond or an aliphatic, arylaliphatic, aromatic or alkylaromatic hydrocarbon radical,
R is a linear or branched aliphatic radical, cycloaliphatic radical, an aromatic radical, or a polymeric chain,
A represents an amine or amine salt functional group, or an acid, ester, acid halide or amide functional group,
B represents an amine or amine salt functional group when A is an acid, ester, acid halide or amide functional group, or B is an acid, ester, acid halide or amide functional group when A is an amine or amine salt functional group, and at least one bifunctional monomer of the following formulae II to IV and optionally, a monofunctional monomer of the following formulae V or VI; or a prepolymer obtained from at least one bifunctional monomer of the following formulae II to IV and optionally, at least one monofunctional monomer of the following formulae V or VI,
the bifunctional monomers satisfying the following general formulae:

$$A_1\text{—}R_3\text{—}A \qquad (II),$$
$$B_1\text{—}R_4\text{—}B_1 \qquad (III),$$
$$A_1\text{—}R_5\text{—}B_1 \qquad (IV)$$

and/or the corresponding lactams of (IV)
the monofunctional monomers satisfying the following general formulae;

$$R_6\text{—}B_1 \qquad (V)$$

and/or $$R_7\text{—}A_1 \qquad (VI)$$

in which
$A_1$, $B_1$ may be identical or different and represent an acid, ester or acid chloride functional group, an amine functional group or an amine salt,
$R_3$, $R_4$, $R_5$, $R_6$, $R_7$ represent aromatic, linear or branched, alkyl hydrocarbon radicals or alkylaryl, arylalkyl or cycloaliphatic radicals optionally including unsaturated groups;
wherein a molar ratio of the multifunctional monomers of formula I to a sum of the difunctional monomers of formulae II, III, IV and monofunctional monomers of formulae V and VI is between 0.01 and 5; and synthesizing a prepolymer of a linear polyamide from one or more monomers of formulae II to IV and, optionally, monofunctional monomers of formula V or VI, in adding, to said prepolymer in a solid state or in a melt, a predetermined amount of polyfunctional monomer and then in making said polyfunctional monomer react with said prepolymer either in the solid state or in the melt.

27. Process according to claim 26, wherein an amidification or polycondensation catalyst is added with the polyfunctional monomer.

28. Composition comprising, as matrix, at least one thermoplastic copolyamide resulting from the reaction between at least one polyfunctional monomer satisfying the following general formula I:

$$(AR_1)\text{—}R\text{—}(R_2B)_n \qquad (I)$$

in which:
n is an integer greater than or equal to 2,
$R_1$, $R_2$ may be identical or different and represent a covalent bond or an aliphatic, arylaliphatic, aromatic or alkylaromatic hydrocarbon radical,
R is a linear or branched aliphatic radical, cycloaliphatic radical, an aromatic radical, or a polymeric chain,
A represents an amine or amine salt functional group, or an acid, ester, acid halide or amide functional group,
B represents an amine or amine salt functional group when A is an acid, ester, acid halide or amide functional group, or B is an acid, ester, acid halide or amide functional group when A is an amine or amine salt functional group, and at least one bifunctional monomer of the following formulae II to IV and optionally, a monofunctional monomer of the following formulae V or VI; or a prepolymer obtained from at least one bifunctional monomer of the following formulae II to IV and optionally, at least one monofunctional monomer of the following formulae V or VI,
the bifunctional monomers satisfying the following general formulae:

$$A_1\text{—}R_3\text{—}A \qquad (II),$$
$$B_1\text{—}R_4\text{—}B_1 \qquad (III),$$
$$A_1\text{—}R_5\text{—}B_1 \qquad (IV)$$

and/or the corresponding lactams of (IV)
the monofunctional monomers satisfying the following general formulae;

$$R_6\text{—}B_1 \qquad (V)$$

and/or $$R_7\text{—}A_1 \qquad (VI)$$

in which
$A_1$, $B_1$ may be identical or different and represent an acid, ester or acid chloride functional group, an amine functional group or an amine salt,
$R_3$, $R_4$, $R_5$, $R_6$, $R_7$ represent aromatic, linear or branched, alkyl hydrocarbon radicals or alkylaryl, arylalkyl or cycloaliphatic radicals optionally including unsaturated groups;
wherein a molar ratio of the multifunctional monomers of formula I to a sum of the difunctional monomers of formulae II, III, IV and monofunctional monomers of formulae V and VI is between 0.01 and 5 and other components chosen from the group consisting of reinforcing fillers, filling fillers, antioxidants, stabilizers, pigments, colorants, fire retardants and molding aids.

29. Thermoplastic copolyamide resulting from the reaction between at least one polyfunctional monomer satisfying the following general formula I:

$$(AR_1)\text{—}R\text{—}(R_2B)_n \qquad (I)$$

in which:
n is an integer greater than or equal to 2,
$R_1$, $R_2$ may be identical or different and represent a covalent bond or an aliphatic, arylaliphatic, aromatic or alkylaromatic hydrocarbon radical, R is a linear or branched aliphatic radical, cycloaliphatic radical, an aromatic radical, or a polymeric chain, A represents an amine or amine salt functional group, or an acid, ester, acid halide or amide functional group, B represents an amine or amine salt functional group when A is an acid, ester, acid halide or amide functional group, or B is an acid, ester, acid halide or amide functional group when A is an amine or amine salt functional group, and at least one bifunctional monomer of the following formulae II to IV and optionally, a monofunctional monomer of the following formulae V or VI; or a prepolymer obtained from at least one bifunctional monomer of the following formulae II to IV and optionally, at least one monofunctional monomer of the following formulae V or VI, the bifunctional monomers satisfying the following general formulae:

 (II),

 (III),

 (IV)

and/or the corresponding lactams of (IV)

the monofunctional monomers satisfying the following general formulae;

 (V)

and/or

 (VI)

in which $A_1$, $B_1$ may be identical or different and represent an acid, ester or acid chloride functional group, an amine functional group or an amine salt, $R_3$, $R_4$, $R_5$, $R_6$, $R_7$ represent aromatic, linear or branched, alkyl hydrocarbon radicals or alkylaryl, arylalkyl or cycloaliphatic radicals optionally including unsaturated groups;

wherein a molar ratio of the multifunctional monomers of formula I to a sum of the difunctional monomers of formulae II, III, IV and monofunctional monomers of formulae V and VI is between 0.01 and 5, wherein R is a polymeric chain containing hetero atoms.

30. Copolyamide according to claim 17, wherein R is an aromatic radical comprising several aromatic rings and/or hetero atoms.

* * * * *